United States Patent Office 2,851,468
Patented Sept. 9, 1958

2,851,468

PREPARATION OF HYDROXYMETHYLFURFURAL FROM CELLULOSIC MATERIALS

Francis H. Snyder, Newtown, Conn., assignor to Dendrol, Inc., Memphis, Tenn., a corporation of Delaware No Drawing. Application June 10, 1953
Serial No. 360,809

5 Claims. (Cl. 260—347.8)

This invention relates to the preparation of hydroxymethylfurfural and more particularly to the preparation of hydroxymethylfurfural from hexoses and materials containing hexoses, by hydrolysis of such materials in the presence of an acid.

It is known that hydroxymethylfurfural is formed from hexoses by dehydration in the presence of an acid and its method of preparation is usually described in the literature as the treatment of sucrose with oxalic acid solution at a temperature of about 130° C. (Haworth and Jones, J. Chem. Soc., 1944, 667). It is also known that hydroxymethylfurfural is formed in small amounts in the acid hydrolysis of wood since it has been found in small concentrations in low pressure wood hydrolyzates. The yield, however, is extremely small since the high reactivity of the compound, both with itself and with other materials, produces humic-like substances in wood hydrolysis. As a consequence of this, wood hydrolysis previously has not been indicated or regarded as a satisfactory method for the preparation of hydroxymethylfurfural.

The principal object of the present invention is the provision of a simple, speedy and economical process for the preparation of hydroxymethylfurfural from hexoses and materials containing hexoses.

Another object of the invention is the provision of a process for preparing hydroxymethylfurfural by the acid hydrolysis of cellulose or other hexose containing, or hexose yielding, raw material such as wood, bagasse, wood pulp, waste paper, glucose, sucrose, cotton waste and the like.

A further object of the invention is the provision of a process for the acid hydrolysis of hexose, or materials containing or yielding hexose, under conditions such as to produce hydroxymethylfurfural in yields which approximate 50–80% or more of theoretical.

In accordance with the invention, it has been found that when hexoses, and materials containing or yielding hexoses, are subjected to high pressure, high temperature hydrolysis with steam, in the presence of an acid and in a non-aqueous phase, under controlled conditions of temperature, pressure, time and pH, as hereinafter pointed out, that a liquid condensation product is obtained, the major component of which is hydroxymethylfurfural. Depending on the particular materials used, such liquid condensation product may also contain furfural and small quantities of sugars, formic acid, acetic acid and levulinic acid. Materials having a high cellulose content, such as wood, are preferred although other hexose containing, or hexose yielding materials, such as bagasse, wood pulp, waste paper, glucose, sucrose, cotton waste, or the like may be used.

The crude solution of hydroxymethylfurfural produced may be used without further purification other than perhaps concentrating the liquid condensation product to remove a portion of the water, or alternatively may be partially or substantially completely recovered from the liquid condensation product in any suitable manner.

Under the conditions of treatment a minimum of the hydroxymethylfurfural formed is converted into other products so that the yield is relatively high. However, since the hydroxymethylfurfural is highly reactive, the liquid condensation product cannot be stored for periods of time in excess of a few days without substantial degradation of the hydroxymethylfurfural.

In a preferred procedure for carrying out the process of the invention, the raw material, for example, hard wood in the form of relatively small chips or slivers is first treated with a dilute acid solution as by spraying, immersion or the like. Excess acid solution is then preferably removed from the chips or slivers by draining, centrifuging or the like, following which they are charged into a high pressure reaction vessel of any suitable type, preferably preheated to within 20 to 30° F. of the reaction temperatures subsequently to be used. High temperature, high pressure steam is then introduced into the reaction vessel to quickly bring the charge up to the desired reaction temperature and pressure where it is maintained throughout a reaction period of relatively short duration. The material is then rapidly discharged from the reaction vessel into a region of reduced pressure and temperature, as for example, a separator maintained at a pressure of from about 50 to 100 p. s. i. g. and corresponding steam temperature, from which the volatiles pass off to the atmosphere or to suitable recovery apparatus and from which the liquids and solids are withdrawn and separated to recover the liquid condensation product containing the hydroxymethylfurfural.

By conducting the hydrolysis in a non-aqueous phase it has been found that the reaction mass is quickly and uniformly heated to reaction temperature and that the accompanying high pressure drives the absorbed acid solution into the innermost pores of the material so that the desired reactions are completed in a relatively short period of time, and undesired side reactions are held to a minimum. In this connection, the term "non-aqueous phase", as used herein, means the hydrolysis treatment of the materials in the substantial absence of free acid solution as distinguished from processes of treatment wherein the materials are cooked or digested in an acid solution. However, it is not intended to exclude the presence of limited quantities of liquid formed in the reaction chamber as a result of the condensation of steam.

Proper control and correlation of the temperature, time, and pH are important to obtain optimum production of hydroxymethylfurfural. In general it has been found that the best results are obtained when the hydrolysis is conducted at temperatures above about 475° F. and above the corresponding steam pressure of 500 pounds per square inch. Any desired temperature and corresponding steam pressure above those indicated may be used. However, at temperatures and corresponding steam pressures substantially above about 574° F. and 1250 pounds per square inch, the time factor becomes so short that the process is difficult to control. Hence in actual practice, the steam temperature and pressure will generally not exceed about 574° F. and 1250 pounds per square inch.

Optimum results are obtained when the process is operated at temperatures between about 513° F. and about 546° F. and at corresponding steam pressures, namely, between about 750 and about 1250 pounds per square inch. This, therefore, is the preferred range of temperatures and pressures and the higher temperatures and pressures of this range are preferred above the lower ones.

The time of treatment must be coordinated with the particular temperature and pressure used. In general, the time of reaction will vary inversely with the temperature and pressure. In other words, as the temperature and pressure are increased, the time of reaction must be correspondingly decreased. Excessive times of reaction result in serious degradation of the hydrolysis products with decreased yields of hydroxymethylfurfural. Times of reaction which are too short likewise result in decreased yields of hydroxymethylfurfural due to undertreatment of the material.

In general, the time of reaction may cover a range from about 10 seconds or less at the higher temperatures and pressures to about 800 seconds at the lower temperatures and pressures. However, for optimum results, it is preferred to operate within the range from about 60 seconds to about 400 seconds, and within these ranges, it will be necessary, of course, to coordinate the time of reaction with the particular pressure and temperature conditions used.

The pH conditions of treatment are particularly important in the production of hydroxymethylfurfural in accordance with the process of the invention. Thus it has been found that unless the pH conditions are maintained so that the pH of the crude hydrolyzate liquor is below about 3 the yield of hydroxymethylfurfural will be substantially reduced because of its tendency to polymerize and otherwise react to form resinous products. The hydroxymethylfurfural also undergoes rather rapid polymerization when the pH is too low as, for example, when it is below about 1.9. The pH of the hydrolyzate liquor, therefore, should be between about 1.9 and 3.0 and preferably between about 2.5 and 2.9 for optimum results.

In the steam hydrolysis of wood under the conditions of treatment herein described some organic acids such as formic, acetic and the like are formed but these are not sufficient to give the required low pH for production of hydroxmethylfurfural in accordance with the invention. It is therefore necessary to employ additional acid and this is preferably done by a pretreatment of the material with dilute acid solution as by spraying or dipping, such treatment being continued until the material absorbs sufficient acid solution to give the desired pH of the hydrolyzate liquor. Any excess free acid solution is then preferably removed by draining, centrifuging or the like, prior to the hydrolysis reaction, as previously indicated herein. Any suitable acid, having an ionization constant such as to give a pH not greater than 3.0 under the particular conditions of treatment, may be used. A mineral acid, such as sulfuric, is preferred. However, lower molecular weight organic acids such as formic, acetic and propionic may be used.

Dilute acid solutions are preferably employed and the concentrations of such solutions may vary from about 0.05% to about 5%. However, most effective results are obtained utilizing acid concentrations between about 0.3% and about 1% and these are preferred.

The following examples will serve to illustrate the invention.

*Example 1*

A ten pound charge of oak wood chips was sprayed with 0.6% sulfuric acid at ambient temperatures for 30 minutes, drained and charged to a preheated reactor. The temperature and pressure within the reactor were quickly raised to about 546° F. and the corresponding steam pressure of 1000 pounds per square inch by the introduction of high temperature, high pressure steam. Approximately 15 seconds were required to reach the indicated temperature and pressure and these were maintained for a reaction period of 90 seconds. At the end of the reaction period the reaction products were discharged into a dry blow-down drum. The blow-down drum was cleaned out with a small amount of water and the reaction products were filtered to separate the solid and liquid phases.

The pH of the crude liquid hydrolyzate product was about 2.6. The principal component of the hydrolyzate liquor as determined by chemical analysis and infra-red absorption spectra, was hydroxymethylfurfural. Relatively small amounts of formic acid, acetic acid, and traces of reducing sugars were also present. Percentage wise the hydroxymethylfurfural constituted about 8% of the crude hydrolyzate liquor and approximately 50–80% of the amount of hydroxymethylfurfural theoretically obtainable from the charge of material treated.

The crude hydrolyzate liquor was readily concentrated by evaporation under vacuum at about 45° C. without appreciable loss of hydroxymethylfurfural. The residue so obtained consisted principally of hydroxymethylfurfural together with smaller quantities of formic acid, acetic acid, and other minor impurities.

*Example 2*

A charge of absorbent cotton was treated in the manner set forth in Example 1. The pH of the crude hydrolyzate liquor was 1.94 and the yield of hydroxymethylfurfural based on the amount theoretically obtainable was smaller than in Example 1 but still within commercially practicable limits. A yield of 7% of furfural was also obtained.

*Example 3*

Puerto Rican bagasse was treated in a similar fashion except that the spraying time was increased to 1 hour due to the fact that this material picked up acid solution more slowly than those previously mentioned. The results obtained were comparable to Example 2.

The hydroxymethylfurfural, produced as herein described, may be used in the form of the crude hydrolyzate liquor which may be concentrated, if desired, or alternatively the crude hydrolyzate liquor may be treated to effect purification and/or recovery of the hydroxymethylfurfural. Any suitable procedure or combination of procedures for effecting purification and/or recovery may be used, such as vacuum distillation at slightly elevated temperature, solvent extraction, and the like.

While a preferred method of preparation of hydroxymethylfurfural has been disclosed herein the invention is not to be construed as limited to the specific procedural details described except as included in the following claims.

I claim:

1. The process of preparing hydroxymethylfurfural from hexoses or materials containing or yielding hexoses which comprises hydrolyzing such materials at a temperature above about 470° F. and at least a corresponding steam pressure in the substantial absence of an aqueous phase in the presence of an acid of such concentration and strength that the pH of the resulting hydrolyzate liquor is between about 1.9 and 3.0.

2. The process as set forth in claim 1 wherein such materials are hydrolyzed for a period of time sufficient to substantially completely convert the hexoses to hydroxymethylfurfural but insufficient to polymerize or otherwise convert a major portion of the hydroxymethylfurfural to resinous products.

3. The method of preparing hydroxymethylfurfural which comprises subjecting a material containing or yielding hexose to a steam hydrolysis in the substantial absence of a liquid phase and in the presence of an acid at a temperature above about 470° F. wherein the amount and concentration of the acid and the time of reaction are such that the crude hydrolysate liquor has a pH between about 1.9 and 3.0.

4. The method as set forth in claim 3 wherein the amount and concentration of the acid is such that the crude hydrolyzate liquor has a pH between about 2.5 and 2.9.

5. The method as set forth in claim 3 wherein the hydrolysis is continued for a period of time sufficient to substantially completely convert the hexose to hydroxymethylfurfural but insufficient to polymerize or otherwise convert a major portion of the hydroxymethylfurfural to resinous products.

References Cited in the file of this patent

UNITED STATES PATENTS

| | | |
|---|---|---|
| 1,735,084 | Miner et al. | Nov. 12, 1929 |
| 1,946,688 | Groth et al. | Feb. 13, 1934 |
| 2,369,655 | Boehm et al. | Feb. 20, 1945 |
| 2,538,457 | Hudson | Jan. 16, 1951 |

FOREIGN PATENTS

| | | |
|---|---|---|
| 585,772 | Great Britain | Feb. 24, 1947 |
| 600,871 | Great Britain | Apr. 21, 1948 |

OTHER REFERENCES

Singh et al.: J. A. C. S., 70, page 517 (1948).

Heuser et al.: Cellulosechemie, vol. 4, pages 13–21, 25–31 (abstracted in Chem. Abstr., vol. 17, col. 3249, 1923).